(12) United States Patent
Oberly, III et al.

(10) Patent No.: US 8,832,401 B2
(45) Date of Patent: Sep. 9, 2014

(54) ITERATIVELY DE-ALLOCATING ACTIVE OBJECTS ASSOCIATED WITH VIRTUAL FUNCTIONS OF AN ADAPTER

(75) Inventors: John R. Oberly, III, Rochester, MN (US); Timothy J. Torzewski, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 673 days.

(21) Appl. No.: 13/013,964

(22) Filed: Jan. 26, 2011

(65) Prior Publication Data

US 2012/0191935 A1      Jul. 26, 2012

(51) Int. Cl.
*G06F 12/14*       (2006.01)

(52) U.S. Cl.
USPC .................................. 711/166; 711/E12.002

(58) Field of Classification Search
USPC .......................................................... 711/166
See application file for complete search history.

(56) References Cited

U.S. PATENT DOCUMENTS

| 2009/0006405 | A1* | 1/2009 | Detlefs et al. ..................... 707/8 |
| 2009/0248937 | A1 | 10/2009 | Solomon et al. |
| 2009/0276773 | A1 | 11/2009 | Brown et al. |
| 2009/0313391 | A1 | 12/2009 | Watanabe |
| 2010/0014526 | A1 | 1/2010 | Chavan et al. |
| 2010/0082874 | A1 | 4/2010 | Baba et al. |
| 2010/0095310 | A1 | 4/2010 | Oshins |
| 2010/0180274 | A1 | 7/2010 | Cherian et al. |
| 2011/0099347 | A1* | 4/2011 | Plasek et al. .................. 711/163 |

* cited by examiner

*Primary Examiner* — Kenneth Lo
(74) *Attorney, Agent, or Firm* — Toler Law Group

(57) ABSTRACT

A method of managing memory may include selecting an object of a memory heap to be de-allocated and initiating a deferred lock configured to delay de-allocation of the object. The deferred lock may be acquired in response to a thread leaving a computing space, and the object may be de-allocated.

20 Claims, 5 Drawing Sheets

ITERATIVELY DE-ALLOCATING ACTIVE OBJECTS ASSOCIATED WITH VIRTUAL FUNCTIONS OF AN ADAPTER

I. FIELD OF THE DISCLOSURE

The present disclosure relates generally to computer systems, and more particularly, to managing memory storage within a multithreaded environment.

II. BACKGROUND

An input/output (I/O) adapter may include hardware components, called physical functions, which are associated with multiple virtual functions. Programmatic objects that correspond to the virtual functions can occupy a considerable amount of memory. Unused objects may be removed, or de-allocated, to efficiently manage computer memory storage. Such objects may no longer be useful after a configuration change, for instance.

De-allocation processes may be complicated by the relatively large number of objects associated with the virtual functions. For example, a thread may try to read storage of an object that is in the process of being deleted. Additionally, deleting all of the objects at the same time may cause system delays and interrupted performance.

III. SUMMARY

In a particular embodiment, a method of managing memory may include selecting an object of a memory heap to be de-allocated and initiating a deferred lock configured to delay de-allocation of the object. The deferred lock may be acquired in response to a thread leaving a computing space, and the object may be de-allocated.

In another particular embodiment, an apparatus may include a memory storing program code and an object heap that includes an object. A processor may be configured to access the memory and to execute the program code to select the object to be de-allocated, to initiate a deferred lock configured to delay de-allocation of the object, to acquire the deferred lock in response to a thread leaving a computing space, and to de-allocate the object.

In another particular embodiment, a program product may include program code configured to be executed by a processor to select an object to be de-allocated, to initiate a deferred lock configured to delay de-allocation of the object, to acquire the deferred lock in response to a thread leaving a computing space, and to de-allocate the object. The program product may further include a non-transitory computer readable medium bearing the program code.

These and other advantages and features that characterize embodiments of the disclosure are set forth in the claims listed below. However, for a better understanding of the disclosure, and of the advantages and objectives attained through its use, reference should be made to the drawings and to the accompanying descriptive matter in which there are described exemplary embodiments of the disclosure.

IV. BRIEF DESCRIPTION OF THE DRAWINGS

V. DETAILED DESCRIPTION

A particular embodiment of a memory management system may de-allocate objects in a manner that waits for code to finish referencing the objects and that uses a limited amount of storage at one time. An incrementing removal index and a removal pointer may be used to walk a live pointer array of active object references. Objects may be de-allocated using successive calls to the function to de-allocate at most one object per call.

When the removal index is invalid, a reference may be removed from the active object array to the removal pointer. That is, a pointer to an object may be moved so that new threads (threads not already present in the hypervisor) cannot locate it. Only threads that are already in the hypervisor may still be able to access the pointer. A deferred lock may be initialized. The deferred lock may be configured to delay de-allocation processes until code has finished referencing objects to be deleted. The deferred lock may be acquired once all the threads have transitioned out of the hypervisor (i.e., out of hypervisor space). At the time that the deferred lock is acquired, the system consequently knows that all threads are done referencing the object. The object reference may be deleted, and the process may iteratively repeat for objects in the live pointer array.

More particularly, the object may be de-allocated once the deferred lock is acquired (after any number of successive calls to de-allocation program code). The removal index may be incremented to point to a next object reference in the live pointer array. A busy status may be returned if the removal index is still within bounds of the live pointer array. The busy signal may cause the de-allocation process to repeat. The iterative approach using successive calls may require less storage than would duplication of the entire live pointer array. Additionally, delays between successive calls in a tasking environment may be used to allow other operations to finish using the reference to each object that is being de-allocated.

Figure 1:
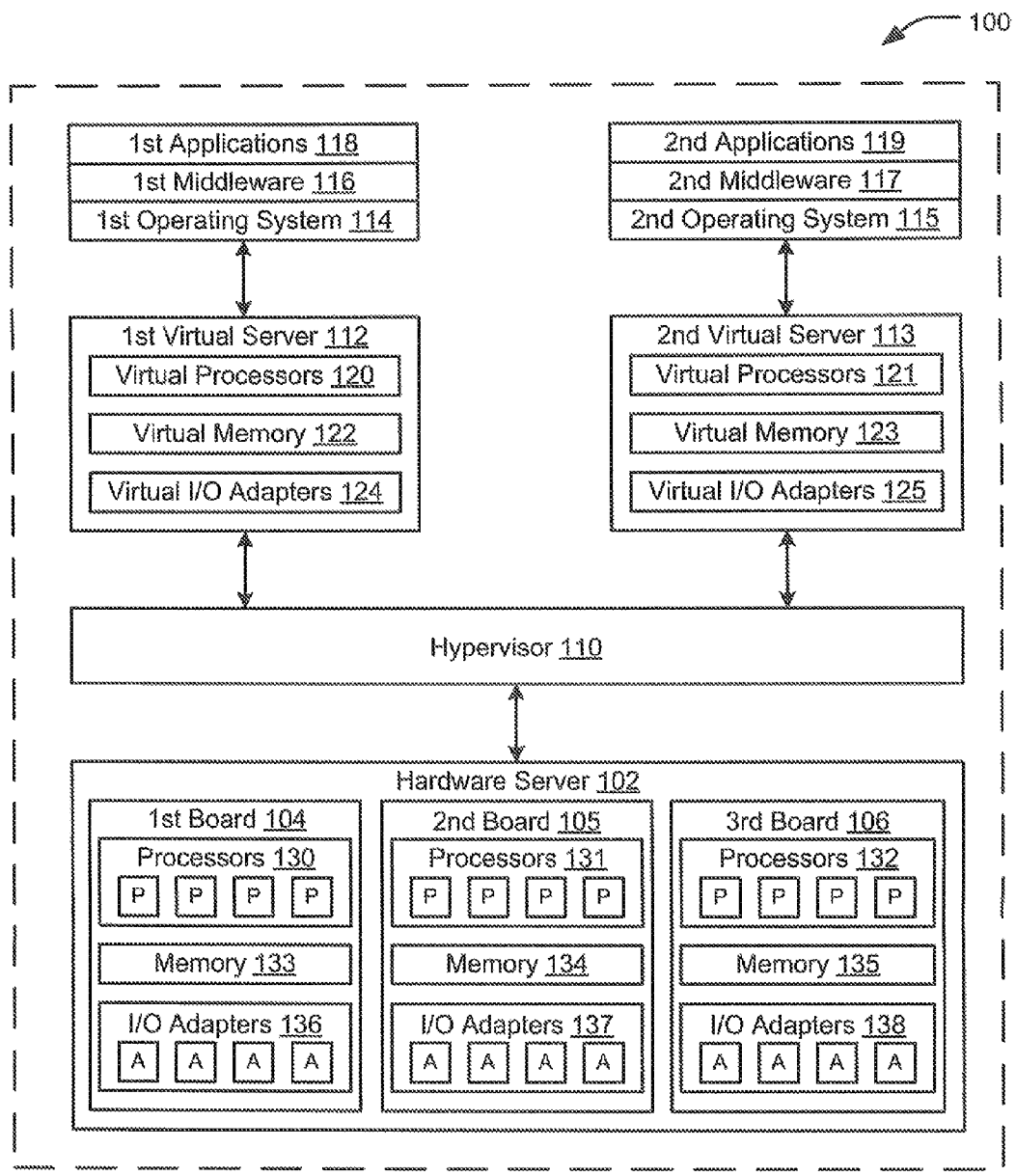
FIG. 1 is a block diagram of a first embodiment of a system to manage memory associated with one or more I/O hardware adapters.

Referring to FIG. 1, a block diagram of a first embodiment of an environment configured to manage memory associated with one or more I/O hardware adapters is depicted and generally designated 100. The system 100 may include a hardware server 102 that is managed by a hypervisor 110. The hardware server 102 may include hardware resources, such as a first board 104, a second board 105, and a third board 106. While three boards are illustrated in FIG. 1, the number of boards may be increased or decreased based on processing considerations. The boards 104-106 may include processors 130-132, memory 133-135, and I/O adapters 136-138. Each of the boards 104-106 may include additional hardware resources (not shown), such as specialized processors (e.g., digital signal processors, graphics processors, etc.), disk drivers, other types of hardware, or any combination thereof. The processors 130-132, the memory 133-135, and the I/O adapters 136-138 of the hardware server 102 may be managed by hypervisor 110. Each processor of the processors 130-132 may be a simultaneous multithreading (SMT)-capable processor that is capable of concurrently executing multiple different threads.

The hypervisor 110 may create and manage logical partitions, such as virtual servers 112, 113. A logical partition may be a subset of the resources of the hardware server 102 that is virtualized as a separate virtual server. Each of the virtual servers 112, 113 may have its own set of virtual resources, similar to a physical server. For example, the first virtual server 112 may include virtual processors 120, virtual memory 122, and virtual I/O adapters 124. Virtual server 113 may include virtual processors 121, virtual memory 123, and virtual I/O adapters 125. The hypervisor 110 may map the hardware of the hardware server 102 to the virtual servers 112, 113. For example, the processors 130-132 may be mapped to the virtual processors 120, 121. The memory 133-135 may be mapped to the virtual memory 122, 123, and the I/O adapters 136-138 may be mapped to the virtual I/O adapters 124-125. The hypervisor 110 may manage the selection of portions of the hardware server 102 and their temporary assignment to portions of the virtual servers 112, 113.

The hypervisor 110 may configure virtual functions, such as the virtual I/O adapters 124, 125 during a time period that is prior to runtime (e.g., during a boot time period or during a firmware standby time period). Resources may be assigned to the virtual I/O adapters 124-125. During the runtime, the hypervisor 110 may assign the pre-configured virtual functions to the operating systems 114, 115 to enable applications and middleware that are executing in the operating systems 114, 115 to perform I/O operations.

Figure 2:
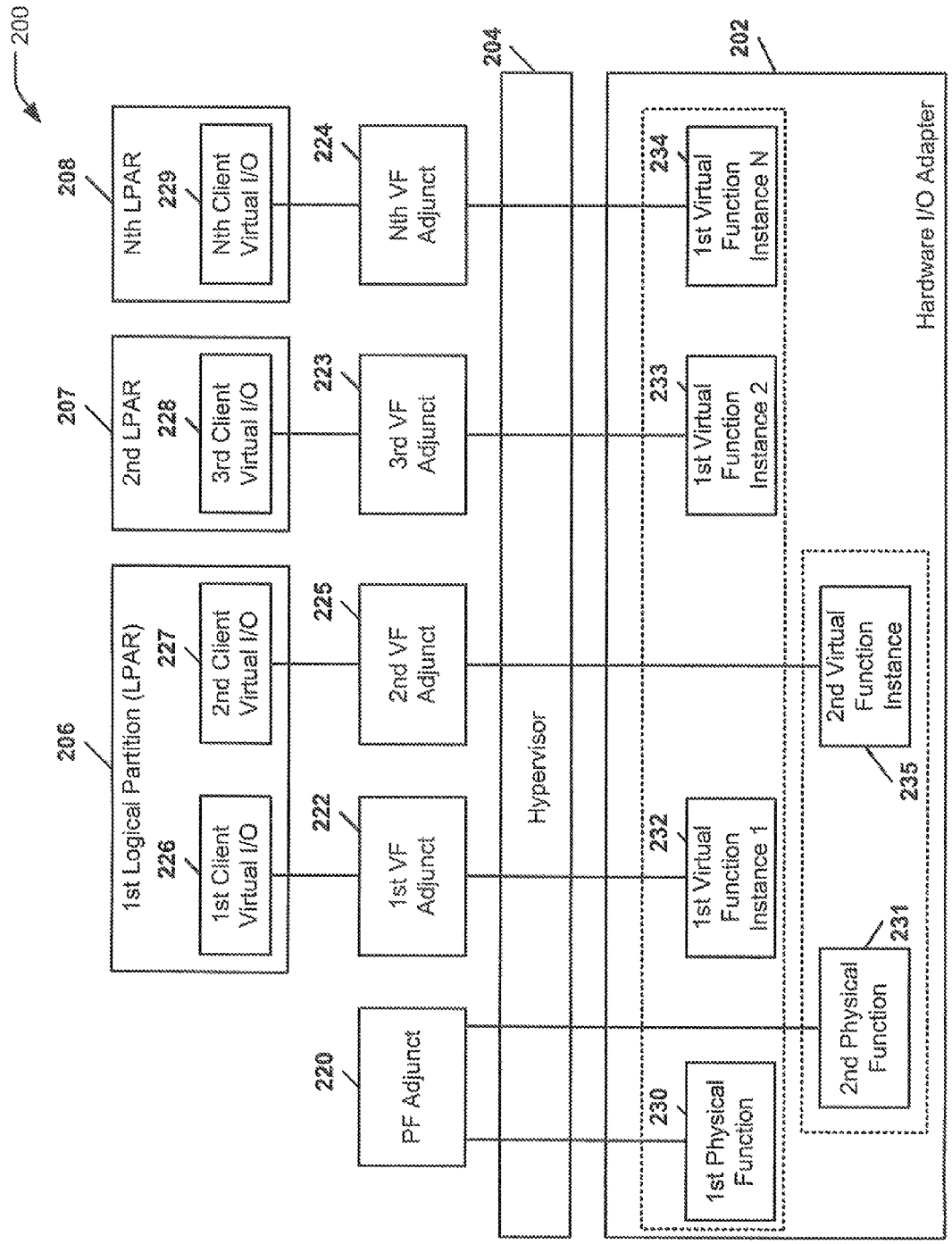
FIG. 2 is a block diagram of a second embodiment of a system to manage memory associated with one or more I/O hardware adapters.

Referring to FIG. 2, a block diagram of a second embodiment of a system configured to manage memory of an input/output hardware adapter is depicted and generally designated 200. In the system 200, a hypervisor 204 may enable multiple logical partitions to access virtual functions provided by hardware that includes a hardware I/O adapter 202. For example, the hypervisor 204 may enable a first logical partition 206, a second logical partition 207, and an Nth logical partition 208, to access virtual functions 232-235 that are provided by the hardware I/O adapter 202. To illustrate, the hypervisor 204 may use a first physical function 230 of the hardware I/O adapter 202 to provide a first instance of a first virtual function 232, a second instance of a first virtual function 233, and an Nth instance of a first virtual function 234 to the logical partitions 206-208. The hypervisor 204 may use a second physical function 231 of the hardware I/O adapter 202 to provide a second virtual function 235 to the logical partitions 206-208.

The physical functions 230, 231 may include peripheral component interconnect (PCI) functions that support single root I/O virtualization capabilities (SR-IOV). Each of the virtual functions 232-235 may be associated with one of the physical functions 230, 231 and may share one or more physical resources of the hardware I/O adapter 202.

Software modules, such as a physical function (PF) adjunct 220 and virtual function (VF) adjuncts 222-225, may assist the hypervisor in managing the physical functions 230, 231 and the virtual functions 232-235. For example, a user may specify a particular configuration and the PF manager 220 may configure the virtual functions 232-235 from the physical functions 230, 231 accordingly. The VF adjuncts 222-225 may function as virtual device drivers. For example, just as a device driver for a physical device may enable a client application to access the functions of the device, each of the VF adjuncts 222-225 may enable a client application to access the virtual functions 232-235. In the system 200, the VF adjuncts 222 and 224-225 may enable access to the first virtual function instances 232 and 234-235, and the second VF adjunct 225 may enable access to the second virtual function 235.

In operation, the PF manager 220 may enable the first virtual function instances 232-234 from the first physical function 230. The PF manager 220 may enable the second virtual function 235 from the second physical function 231. The virtual functions 232-235 may be enabled based on a user provided configuration. Each of the logical partitions 206-208 may execute an operating system (not shown) and client applications (not shown). The client applications that execute at the logical partitions 206-208 may perform virtual input/output operations. For example, a first client application executing at the first logical partition 206 may include first client virtual I/O 226, and a second client application executing at the first logical partition 206 may include a second client virtual I/O 227. The first client virtual I/O 226 may access the first instance of the first virtual function 232 via the first VF adjunct 222. The second client virtual I/O 227 may access the second virtual function 235 via the second VF adjunct 225. A third client virtual I/O 228 executing at the second logical partition 207 may access the second instance of the first virtual function 233 via the third VF adjunct 223. An Nth client virtual I/O 229 executing at the Nth logical partition 208 may access the Nth instance of the first virtual function 233 via the Nth VF adjunct 224.

The hypervisor 204 may enable the client virtual I/Os 226-229 to access the virtual functions 232-235 that are associated with the physical functions 230, 231 of the hardware I/O adapter 202. The virtual functions 232-235 of the hardware I/O adapter 202 may be configured prior to a runtime and dynamically assigned during runtime, as described below. For example, the hypervisor 204 may configure virtual functions 232-235 during a time period that is prior to runtime (e.g., during a boot time period or during a firmware standby time period). During the runtime, the hypervisor 204 may assign the pre-configured virtual functions 232-235 to the logical partitions 206-208 to enable client applications that are executing in the logical partitions 206-208 to perform I/O operations. It will be appreciated by one skilled in the art that the present invention is equally suited to embodiments that do not utilize a virtual function (VF) manager and client virtual I/O to enable a logical partition to access a virtual function, and instead enable a device driver within a logical partition to directly manage the virtual function.

Figure 3:
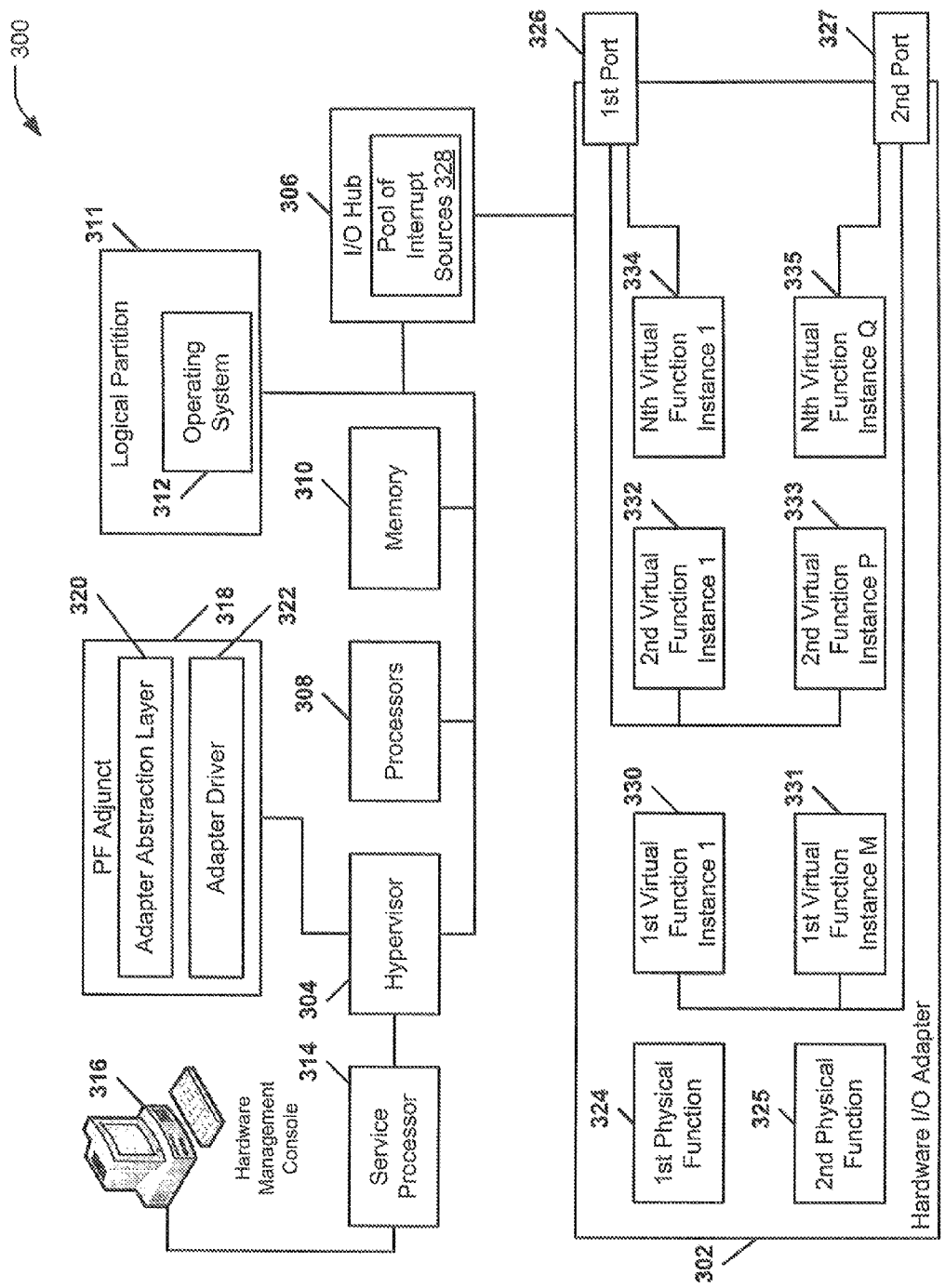
FIG. 3 is a block diagram of a third embodiment of a system to manage memory associated with one or more I/O hardware adapters.

Referring to FIG. 3, a block diagram of a third embodiment of a system to manage memory associated with an I/O hardware adapter is depicted and generally designated 300. In the system 300, a hypervisor 304 may be coupled to hardware devices, such as a hardware I/O adapter 302, an I/O hub 306, processors 308, and a memory 310. The hypervisor 304 may be coupled to a logical partition 311 that executes an operating system 312. The hypervisor 304 may enable the logical partition 311 to access virtual functions associated with the hardware I/O adapter 302. A physical function (PF) manager 318 may be coupled to the hypervisor 304 to manage the physical functions of the hardware I/O adapter 302. In a particular embodiment, the PF manager 318 may be in a logical partition. A hardware management console 316 may be coupled to the hypervisor 304 via a service processor 314.

The service processor 314 may be a microcontroller that is embedded in a hardware server (e.g., the hardware server 102 of FIG. 1) to enable remote monitoring and management of the hardware server via the hardware management console 316. For example, the hardware management console 316 may be used by a system administrator to specify a configuration of hardware devices, such as specifying virtual functions of the hardware I/O adapter 302. The PF manager 318 may configure virtual functions of the hardware I/O adapter 302 based on configuration information provided by a system administrator via the hardware management console 316.

The hypervisor 304 may enable hardware devices, such as the hardware I/O adapter 302, to be logically divided into virtual resources and accessed by one or more logical partitions (e.g., the N logical partitions 206-208 of FIG. 2). The I/O hub 306 may include a pool of interrupt sources 328. The hypervisor 304 may associate at least one interrupt source from the pool of interrupt sources 328 with each virtual function of the hardware I/O adapter 302.

The I/O hub 306 may be a hardware device (e.g., a microchip on a computer motherboard) that is under the control of the hypervisor 304. The I/O hub 306 may enable the hypervisor to control I/O devices, such as the hardware I/O adapter 302.

The processors 308 may include one more processors, such as central processing units (CPUs), digital signal processors (DSPs), other types of processors, or any combination thereof. One or more of the processors 308 may be configured in a symmetric multiprocessor (SMP) configuration.

The memory 310 may include various types of memory storage devices, such as random access memory (RAM) and disk storage devices. The memory 310 may be used to store and retrieve various types of data. For example, the memory 310 may be used to store and to retrieve operational instructions that are executable by one or more of the processors 308.

The operating system 312 may execute within the logical partition 311. The virtual I/O of client applications (e.g., the client virtual I/Os 226-229 of FIG. 2) that execute using the operating system 312 may access virtual functions of the hardware I/O adapter 302. The hypervisor 304 may use the I/O hub 306 to connect to and control I/O devices, such as the hardware I/O adapter 302.

The PF manager 318 may include an adapter abstraction layer 320 and an adapter driver 322. The adapter abstraction layer 320 may include a generic abstraction to enable configuration of physical functions and virtual functions of the hardware I/O adapter 302. The adapter driver 322 may be specific to each particular model of hardware adapter. The adapter driver 322 may be provided by a manufacturer of the hardware I/O adapter 302.

The hardware I/O adapter 302 may include physical functions and ports, such as a first physical function 324, a second physical function 325, a first port 326, and a second port 327. The PF manager 318 may configure virtual functions based on the physical functions 324, 325 and associate the virtual functions with one or more of the ports 326, 327 of the hardware I/O adapter 302. For example, the PF manager 318 may configure the first physical function 324 to host multiple instances of a first virtual function, such as the first instance of the first virtual function 330 and the Mth instance of the first virtual function 331, where M is greater than 1. The instances of the first virtual function 330, 331 may be associated with the second port 327. The PF manager 318 may configure the second physical function 325 to host multiple instances of a second virtual function, such as the first instance of the second virtual function 332 and the Pth instance of the second virtual function 333, where P is greater than 1. The instances of the second virtual function 332, 333 may be associated with the first port 326. The PF manager 318 may configure multiple instances of an Nth virtual function, such as the first instance of the Nth virtual function 334 and the Qth instance of the Nth virtual function 335, where N is greater than 2, and Q is greater than 1. The instances of the Nth virtual function 334, 335 may be associated with the second port 327. The instances of the Nth virtual function 334, 335 may be hosted by a physical function, such as one of the first physical function 324, the second physical function 325, and another physical function (not shown).

The hypervisor 304 may thus enable access to the virtual functions 330-335 that are associated with the physical functions 324, 325 of the hardware I/O adapter 302. The virtual functions 330-335 of the hardware I/O adapter 302 may be configured prior to a runtime and dynamically assigned during runtime, as described below. For example, the hypervisor 304 may configure the virtual functions 330-335 during a time period that is prior to runtime (e.g., during a boot time period or during a firmware standby time period). During the runtime, the hypervisor 304 may assign the pre-configured virtual functions 330-335 to a logical partition (e.g., the local partition 311) to enable client applications that are executing in the logical partition to perform I/O operations.

Figure 4:
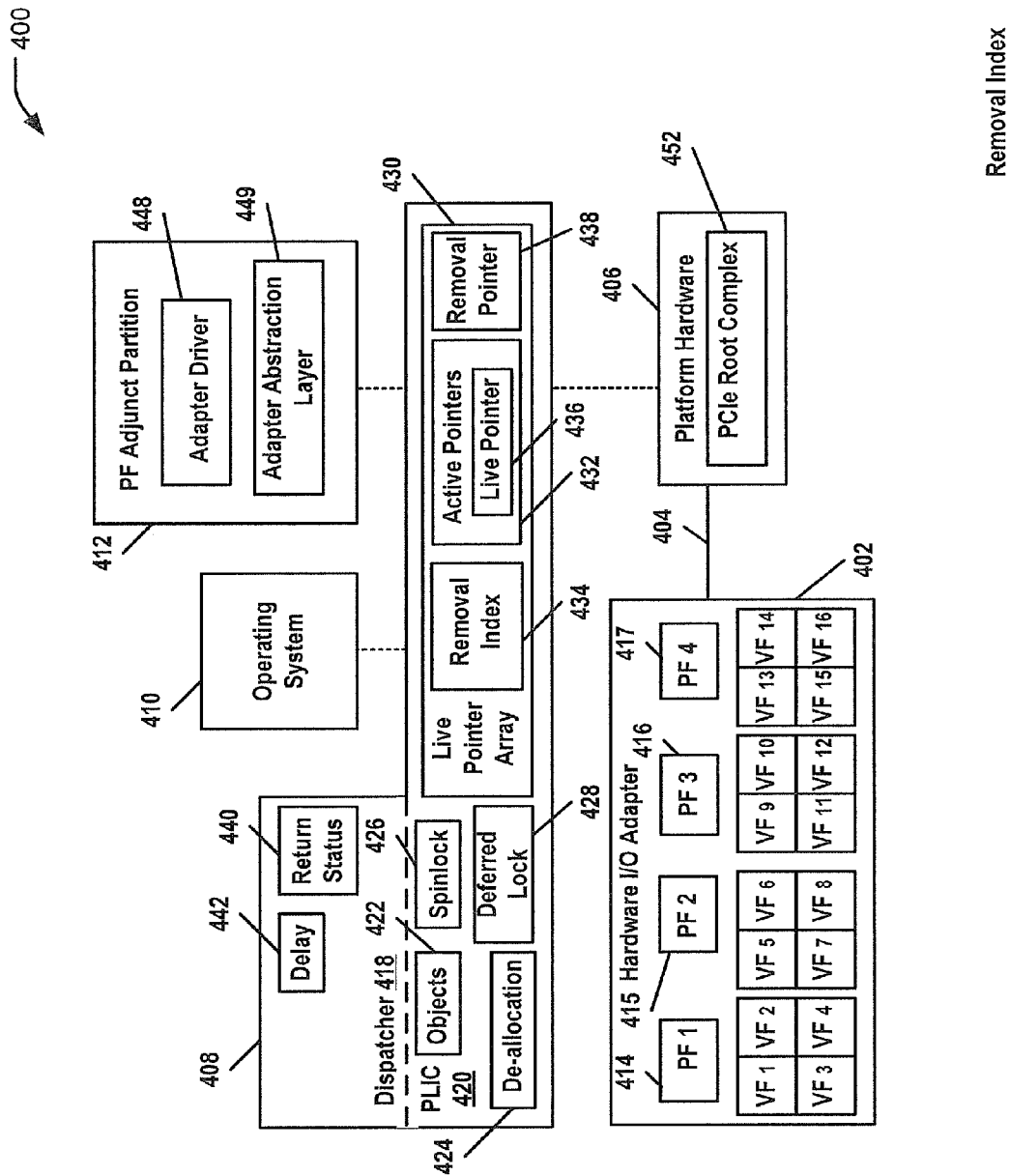
FIG. 4 is a block diagram of an embodiment of a system to de-allocate objects associated virtual functions of an I/O adapter.

Referring to FIG. 4, a block diagram of an embodiment of a system to de-allocate objects associated with virtual functions of an I/O adapter. The system 400 may include a hardware I/O adapter 402 that is coupled to platform hardware 406 via a Peripheral Component Interconnect Express (PCIe) bus 404. The hardware I/O adapter 402 may be similar to the hardware I/O adapters 136-138 of FIG. 1, as well as to the hardware I/O adapters 202 and 302 of FIGS. 2 and 3, respectively.

The system 400 may further include a hypervisor 408, an operating system 410, and a PF adjunct partition 412. The hypervisor 408 may be similar to the hypervisor 110 of FIG. 1, the hypervisor 204 of FIG. 2, and the hypervisor 304 of FIG. 3. The PF adjunct partition 412 may be similar to the PF adjunct 220 of FIG. 2, the VF adjuncts 222-224 of FIG. 2, and the PF adjunct 318 of FIG. 3, or a combination of both.

The hypervisor 408 may include privileged executable code that is capable of enforcing partitioning and accessing resources, such as processor resources and memory, assigned to any partition. The hypervisor 408 may maintain state data in various special purpose hardware registers or other memory, which govern boundaries and behavior of the logical partitions. Among other things, this state data may define the allocation of resources to logical partitions, and the allocation may be altered by changing the state data rather than by physical reconfiguration of hardware.

The hypervisor 408 may include a non-relocatable, non-dispatchable portion, termed partitioning licensed internal code (PLIC) 420. In general, the PLIC 420 may manage the assignment of tasks to physical processors, memory mapping and partition enforcement, as well as similar essential partitioning tasks required to execute application code in a partitioned system. The PLIC 420 may include instructions that are executed by a processor, such as one of the processors 308 of FIG. 3, to accomplish tasks executing in the partitions. The PLIC 420 may be non-relocatable, meaning that the associated code may be fixed real address in memory.

The hypervisor 408 may further include a relocatable, dispatchable portion called a hypervisor dispatcher 418. The hypervisor dispatcher 418 (as well as all partitions) may be contained at addresses that are relative to a logical partitioning assignment, and therefore the code may be relocatable. The hypervisor dispatcher 418 may manage maintenance-oriented tasks, such as creating and altering partition definitions.

As represented in the particular embodiment of FIG. 4, the PLIC 420 includes objects 422, de-allocation program code 424, a spinlock 426, a deferred lock 428, and a live pointer array 430. The objects 422 may include both data structures and methods, and may be stored in an object heap. The objects 422 may be associated with virtual functions VF1-VF16. The de-allocation program code 424 may be executed by processors to perform the object de-allocation processes described herein. The spinlock 426 may include a programmatic lock that causes a thread to wait in a loop until the spinlock becomes available. The deferred lock 428 may not be acquired to allow process execution until all threads have left a designated execution space (e.g., the PLIC 420).

The live pointer array 430 may include active pointers 432 that reference the objects 422. A removal index 434 may incrementally indicate which object 422 in the live pointer array 430 should be deleted. A live pointer 436 of the active pointers 432 may be the current active pointer in the live pointer array 430 indexed by the removal index 434. A removal pointer 438 may be used to store a copy of the live pointer, after which the live pointer 436 may be nulled. The removal pointer 438 may only be used by the removal process and not be accessed by main path PLIC code via calls from operating systems or other applications.

The hypervisor dispatcher 418 may include a return status indicator 440 that informs whether de-allocation processes are still in process. The de-allocation processes may resume after a delay 442. During such periodic delays, the hypervisor 408 may be accessed by the operating system 410 and other applications (not shown).

The hardware I/O adapter 402 may include physical functions 414-417. The physical functions 414-417 may be similar to the physical functions 324, 325 of FIG. 3. Each physical function 414-417 may be associated with one or more of the virtual functions VF1-VF16. A virtual function VF1-VF16 may be similar to the virtual functions 330-335 of FIG. 3.

The platform hardware 406 may include system hardware, such as processors and memory (not shown), in addition to a PCIe root complex 452. The PF adjunct partition 412 may include an adapter driver 448 and a data abstraction layer 449. The adapter driver 448 may be similar to the adapter driver 322 of FIG. 3, and the adapter abstraction layer 449 may be similar to the adapter abstraction layer 320 of FIG. 3.

Figure 5:
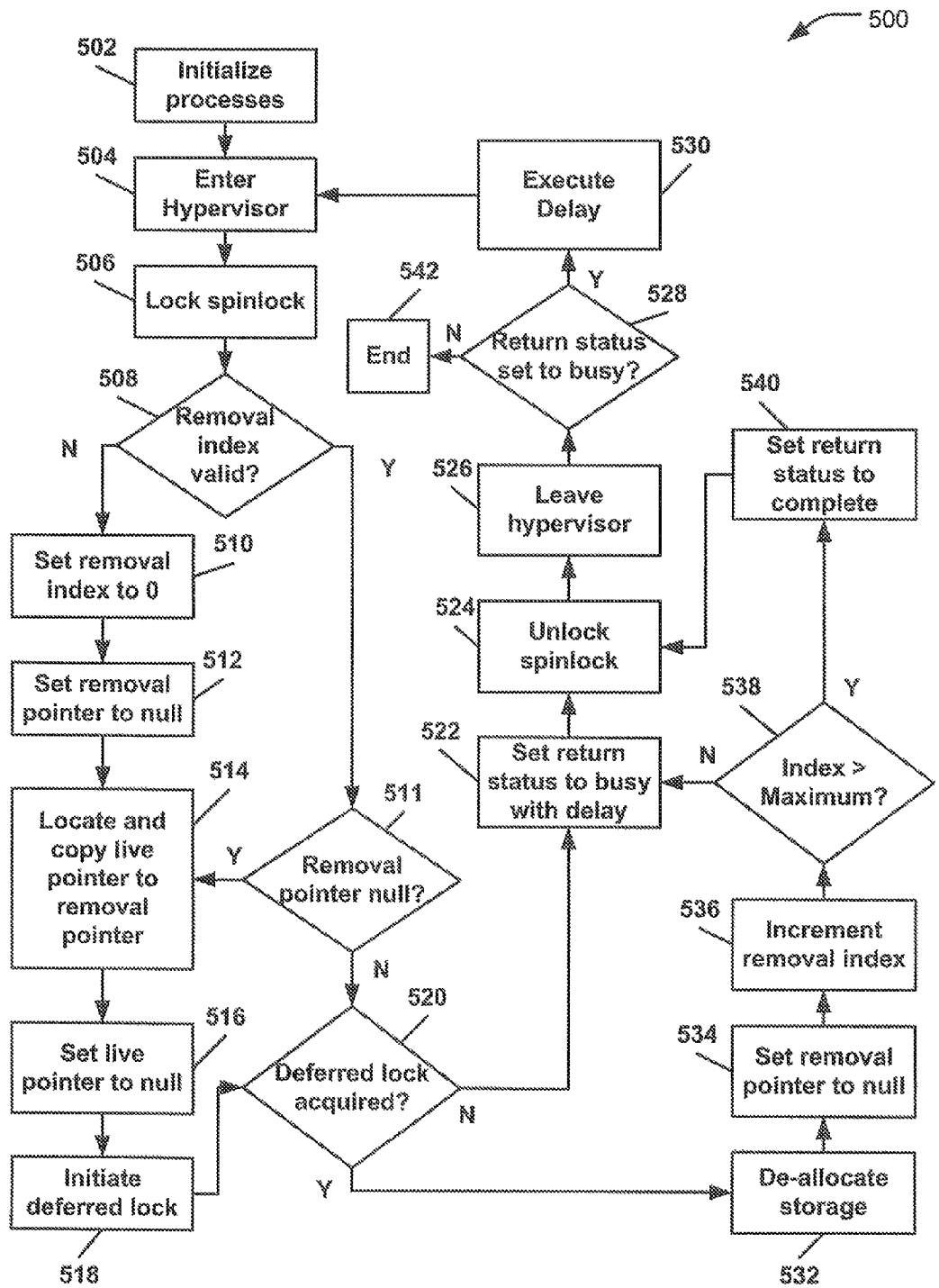
FIG. 5 is a flowchart of a process to de-allocate objects associated virtual functions of an I/O adapter.

FIG. 5 is a flowchart 500 of an embodiment of a method to de-allocate objects that correspond to virtual functions of an I/O adapter. The illustrative method may be executed by one or more of the systems 100, 200, 300, 400 of FIGS. 1-4. For example, an embodiment of the method may be executed by the hypervisor 408 of FIG. 4 to de-allocate the objects 422 of FIG. 4 that correspond to the virtual functions 414-417 of the I/O adapter 402.

Turning more particularly to the flowchart 500, the hypervisor 408 may execute initialization processes at 502. Such processes may include setting the removal index to invalid. For instance, the hypervisor dispatcher 418 of FIG. 4 may set the removal index 434 to invalid (e.g., not pointing to an entry in the live pointer array).

The hypervisor may be entered at 504. More particularly, de-allocation processes may begin to be executed at the PLIC and may consequently begin to access processor cycles.

A spinlock may be activated at 506. The spinlock may lock around the live pointer array of active pointers. For example, the spin lock 428 of FIG. 4 may be set around the liver pointer array 430. The spinlock 428 may cause hypervisor components desiring to access an object 422 to proceed to the live pointer array 430.

The hypervisor may determine at 508 if the removal index is valid (e.g., indicating an active pointer of an object to be deleted). Because the removal index has been initialized to be invalid at 502, the PLIC may set the removal index to zero at 510. The zero setting may correspond to a first active pointer. Setting the removal index 434 of FIG. 4 to zero may initiate processes to locate an object for removal.

The removal pointer may be set to null at 512. The removal pointer may otherwise be configured to point to an object in the live pointer array, if any, that should be deleted. The removal pointer 438 of FIG. 4 may be set to null (e.g., no object reference is currently selected for deletion).

The hypervisor may locate the live pointer of the live pointer array at 514. The live pointer may be the active pointer to the next object to be removed, indexed by the removal index. The hypervisor may copy the live pointer to the removal pointer. For example, the PLIC 420 may copy the live pointer 436 to the removal pointer 438. Copying the live pointer 436 may preserve access to the associated object for those applications already within hypervisor space at 514. At this time, new applications may continue to locate the object reference via its live (e.g., active) pointer in the live pointer array.

The live pointer may be set to null at 516. Other hypervisor components may be prevented from finding the pointed-to object to be de-allocated. However, the removal process may continue to access the pointer and pointed-to object via the removal pointer for the purposes of de-allocating the object. During this time, applications that may presently be accessing the object pointed-to by the pointer previously obtained from the live pointer may continue to access the pointed-to object.

A deferred lock may be initiated at 518. For instance, the PLIC 420 of FIG. 4 may initiate the deferred lock 428. The deferred lock may prevent the de-allocation of the object while other applications are still referencing it. For instance, a deferred lock may not be acquired until all threads have left a designated computing space (e.g., hypervisor space). When all threads have exited the hypervisor, the system knows that there can be no thread remaining to reference the object to be de-allocated.

Should the deferred lock not be acquired at 520, the PLIC may set a return status register to busy at 522 and may include a delay for the hypervisor dispatcher. In the context of FIG. 4, the busy return status 440 may inform the hypervisor dispatcher 418 that the de-allocation process is incomplete and will be returning to the PLIC 420. The delay 442 may be predetermined and adjustable. The delay 442 may communicate to the hypervisor dispatcher 418 an amount of time during which the hypervisor dispatcher 418 will do nothing with regards to the de-allocation process. The delay 442 may further allow other operating system images to access the processor (e.g., via the PLIC).

The hypervisor may then unlock spinlock for the live pointer array at 524. For instance, the PLIC 420 of FIG. 4 may unlock the spinlock to allow other applications to access the live pointer array 430.

De-allocation processes may exit the PLIC at 526. As such, the de-allocation processes may cease to use processor cycles until reentering the PLIC.

The hypervisor dispatcher may determine at 528 that the return status register is set to busy. The busy status may inform the hypervisor dispatcher that the de-allocation process is ongoing and will be continued after the delay. In response, the hypervisor dispatcher may coordinate timing processes such that the de-allocation process is allowed to reenter the PLIC at 504 upon the expiration of the requested delay at 530.

As before, the PLIC may initiate the spinlock at 506, and may check the removal index for a valid entry at 508. At this point, the removal index may have a valid value (i.e., zero) set previously at 510. As such, the PLIC may transition to 511 to determine whether the removal pointer is null. As the removal pointer may now point to the copied live pointer to be deleted, the removal pointer is no longer null.

The hypervisor may check to see if the deferred lock has been acquired at 520. If not, then the processes associated with 522-530 may repeat until the deferred lock may be acquired. The de-allocation processes may leave the PLIC in response to each failure to acquire the deferred lock. Leaving the PLIC may free up the PLIC and associated processor cycles for other applications, such as another operating system image.

The object referenced by the removal pointer may be de-allocated at 532 in response to the acquisition of the deferred lock at 520. For example, the object of FIG. 4 pointed to by the removal pointer (and formerly pointed to by the live pointer) may be de-allocated and the associated memory space may be returned to a storage heap.

The removal pointer may be set to null at 534. For instance, the PLIC of FIG. 4 may set the removal pointer to null. The null setting may indicate that the object has been removed and may affect subsequent processes at 512.

The removal index may be incremented at 536. For example, the PLIC of FIG. 4 may increment the removal index 434 from zero to one. Of note, the live pointer may essentially move (at 514 and 516) with each subsequent increment of the removal index at 536. The hypervisor may determine at 538 if the incremented removal index is larger than a preset maximum. The preset maximum may coincide with the number of entries in the live pointer array. The removal index being larger than the present maximum may thus indicate that the de-allocation process has sequenced through the entire live pointer array. Where the de-allocation program code has sequenced through the entire live pointer array, the PLIC may set the return status to complete at 540. The complete status may be communicated to the hypervisor dispatcher at 528, and may prompt the PLIC to end the de-allocation process at 542.

Where the incremented removal index is alternatively not larger than the preset maximum at 538, the incremented removal index may be used to locate a pointer to an object and de-allocate an object, beginning back at 522 (with the incremented removal index).

Particular embodiments described herein may take the form of an entirely hardware embodiment, an entirely software embodiment or an embodiment containing both hardware and software elements. In a particular embodiment, the disclosed methods are implemented in software that is embedded in processor readable storage medium and executed by a processor, which includes but is not limited to firmware, resident software, microcode, etc.

Further, embodiments of the present disclosure, such as the one or more embodiments may take the form of a computer program product accessible from a computer-usable or computer-readable storage medium providing program code for use by or in connection with a computer or any instruction execution system. For the purposes of this description, a computer-usable or computer-readable storage medium may be any apparatus that may tangibly embody a computer program and that may contain, store, communicate, propagate, or transport the program for use by or in connection with the instruction execution system, apparatus, or device.

In various embodiments, the medium may include an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and digital versatile disk (DVD).

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments, including embodiments of I/O adapters virtualized in multi-root input/output virtualization (MR-IOV) embodiments, or virtualized using software virtualization intermediaries, will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method of managing memory, the method comprising:
   selecting an object of a memory heap to be de-allocated;
   initiating a deferred lock configured to delay de-allocation of the object;
   relinquishing use of a processor after the deferred lock is initialized;
   acquiring the deferred lock in response to a thread leaving a computing space; and
   de-allocating the object.

2. The method of claim 1, further comprising enabling continued access to the object by an application operating within the computing space at a point when the deferred lock is initiated.

3. The method of claim 1, wherein the thread leaves the computing space after the selection of the object to be de-allocated.

4. The method of claim 1, further comprising reclaiming use of the processor after the deferred lock is acquired.

5. The method of claim 1, further comprising using a removal index to locate a reference associated with the object.

6. The method of claim 5, further comprising incrementing the removal index.

7. The method of claim 1, further comprising copying a reference associated with the object to a removal pointer.

8. The method of claim 7, further comprising setting the removal pointer to null.

9. The method of claim 1, further comprising applying a spinlock to a live pointer array that includes a reference associated with the object.

10. The method of claim 1, further comprising retrieving a return status.

11. The method of claim 1, further comprising determining that a removal index is valid.

12. The method of claim 1, further comprising setting the delay.

13. The method of claim 1, further comprising comparing a removal index to a live pointer array that includes a reference associated with the object.

14. An apparatus comprising:

a memory storing program code and an object heap including an object; and a processor configured to access the memory and to execute the program code to select the object to be de-allocated, to initiate a deferred lock configured to delay de-allocation of the object, to acquire the deferred lock in response to a thread leaving a computing space, and to de-allocate the object, wherein the computing space includes a hypervisor space.

15. The apparatus of claim 14, wherein the object is associated with a virtual function of an input/output adapter.

16. The apparatus of claim 14, wherein the processor is further configured to execute the program code to detect the thread leaving the computing space.

17. The apparatus of claim 14, wherein the memory further includes a removal index that is incremented to select the object to be de-allocated.

18. A method of managing memory, the method comprising:

selecting an object of a memory heap to be de-allocated;

applying a spinlock to a live pointer array that includes a reference associated with the object;

initiating a deferred lock configured to delay de-allocation of the object;

acquiring the deferred lock in response to a thread leaving a computing space; and de-allocating the object.

19. The method of claim 18, further comprising copying a reference associated with the object to a removal pointer.

20. The method of claim 18, further comprising determining that a removal index is valid.

* * * * *